(12) United States Patent
Hepworth et al.

(10) Patent No.: US 8,194,831 B2
(45) Date of Patent: Jun. 5, 2012

(54) DETERMINING A PREFERABLE MODE OF COMMUNICATING WITH A CALLED PARTY

(75) Inventors: Neil Hepworth, San Francisco, CA (US); Ted Saoumi, Georges Hall (AU)

(73) Assignee: Avaya Inc., Basking Ridge, NJ (US)

( * ) Notice: Subject to any disclaimer, the term of this patent is extended or adjusted under 35 U.S.C. 154(b) by 1008 days.

(21) Appl. No.: 12/165,811

(22) Filed: Jul. 1, 2008

(65) Prior Publication Data

US 2010/0002859 A1 Jan. 7, 2010

(51) Int. Cl.
*H04M 15/00* (2006.01)
*G06F 17/28* (2006.01)
*G08B 1/08* (2006.01)

(52) U.S. Cl. ............... 379/140; 340/407.1; 340/539.12; 379/88.16; 379/210.01; 379/211.02; 455/414.4; 704/5; 709/224; 709/238

(58) Field of Classification Search ............ 340/539.12, 340/407.1; 379/88.16, 140, 210.01, 211.02; 455/414.4; 704/5; 709/238, 224
See application file for complete search history.

(56) References Cited

U.S. PATENT DOCUMENTS

| | | | | |
|---|---|---|---|---|
| 7,443,283 B2 * | 10/2008 | Schmandt et al. | ......... | 340/407.1 |
| 7,571,249 B2 * | 8/2009 | Wu | ................... | 709/238 |
| 7,675,411 B1 * | 3/2010 | Michaelis et al. | ....... | 340/539.12 |
| 7,706,785 B2 * | 4/2010 | Lei et al. | ................ | 455/414.4 |
| 8,046,454 B2 * | 10/2011 | Song et al. | ................. | 709/224 |
| 2002/0085701 A1 | 7/2002 | Parsons et al. | | |
| 2004/0267887 A1 | 12/2004 | Berger et al. | | |
| 2005/0068166 A1 | 3/2005 | Baker | | |
| 2005/0165891 A1 | 7/2005 | Moody et al. | | |
| 2006/0069686 A1 | 3/2006 | Beyda et al. | | |
| 2006/0239424 A1 | 10/2006 | Walter | | |
| 2007/0081640 A1 * | 4/2007 | Jachner | ................ | 379/88.16 |
| 2007/0239428 A1 * | 10/2007 | Milstein et al. | ............ | 704/5 |
| 2008/0130860 A1 * | 6/2008 | Mullis et al. | ............ | 379/211.02 |
| 2009/0022297 A1 * | 1/2009 | Jackson et al. | ........... | 379/210.01 |
| 2010/0002859 A1 * | 1/2010 | Hepworth et al. | ............ | 379/140 |

FOREIGN PATENT DOCUMENTS

| | | |
|---|---|---|
| EP | 1542430 A1 | 6/2005 |
| EP | 1675371 A1 | 6/2006 |
| EP | 1696647 A1 | 8/2006 |
| GB | 2422231 A | 7/2006 |
| WO | 2007/113516 A1 | 10/2007 |

OTHER PUBLICATIONS

Coughlan, U.S. Appl. No. 11/857,198, entitled "Using Communication History to Determine Availability of a Person Over Time," filed Sep. 18, 2007.

* cited by examiner

*Primary Examiner* — Gerald Gauthier

(57) ABSTRACT

A called party's communications habits are determined from the party's communications history, and the habits and the called party's current state (presence) are analyzed in view of a calling party's parameters for a desired communication with the called party to determine a preferable mode and/or time for the desired communication. The preference is indicated to the calling party to assist the calling party in effecting the desired communication.

21 Claims, 2 Drawing Sheets

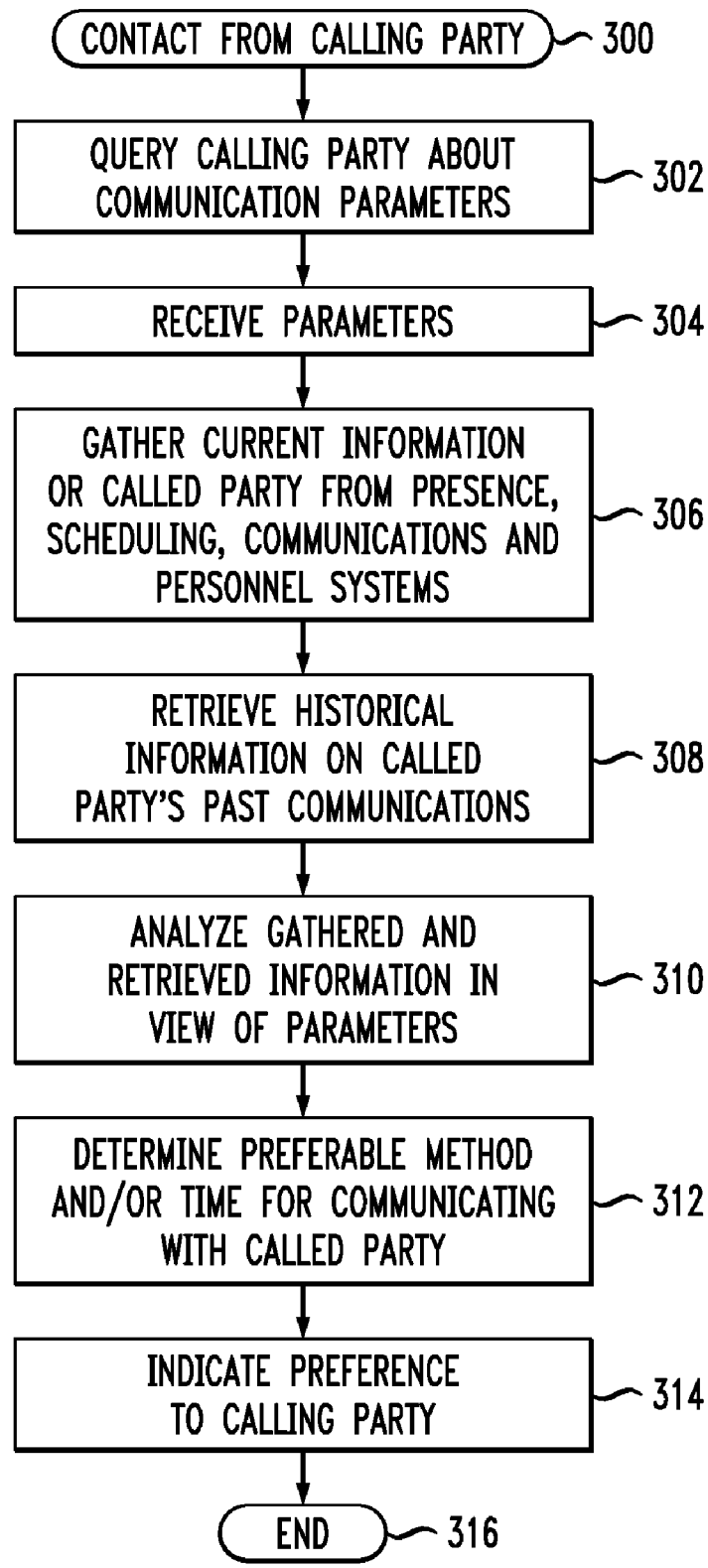

US 8,194,831 B2

DETERMINING A PREFERABLE MODE OF COMMUNICATING WITH A CALLED PARTY

TECHNICAL FIELD

This invention relates generally to communications systems and specifically to selection of communication type in such system.

BACKGROUND OF THE INVENTION

Electronic communications between parties can take a variety of forms (a.k.a. types or media) such as real-time voice communications over a wired, wireless or Voice over Internet Protocol system, voicemail, text messaging, instant messaging, on-line chat, email, etc. Unless a party that is initiating a communication (the "calling party") to another party (the "called party") is relying upon remembrance of its past experiences with the called party, the calling party usually does not know what type of communication with the called party is likely to be most effective (e.g., is most likely to succeed at any time).

It is known to provide the calling party with presence information about the called party. But the presence information generally indicates whether and where the calling party may currently be reached, and not by what type of communication the calling party is currently best reached.

SUMMARY OF THE INVENTION

According to an aspect of the invention, a called party's communications habits are used together with current information to determine a preferable mode of communicating with the called party, and the preference is indicated to the calling party. The communications habits are illustratively determined from the called party's behavior with respect to prior communications involving the called party, such as whether the prior communication was answered, redirected to a mailbox, etc., and the then-current state of the called party. The current information illustratively includes parameters of the current communication desired by the calling party and the current state of the called party. The parameters illustratively include things like the type, importance, urgency, sensitively, and anticipated length of the communication. The state illustratively includes presence. The mode of communicating illustratively includes the preferable communications method and/or user terminal (e.g., voice, text, real-time call via desk-phone or mobile phone, voicemail, email, instant messaging, etc.) and/or the preferable time for the communication. The preference is illustratively based on which mode of communication is most effective and/or most likely to succeed at a particular time.

BRIEF DESCRIPTION OF THE DRAWING

FIG. 3 is a flow diagram of a query-response function of the behavior monitoring system.

DETAILED DESCRIPTION

Figure 1:
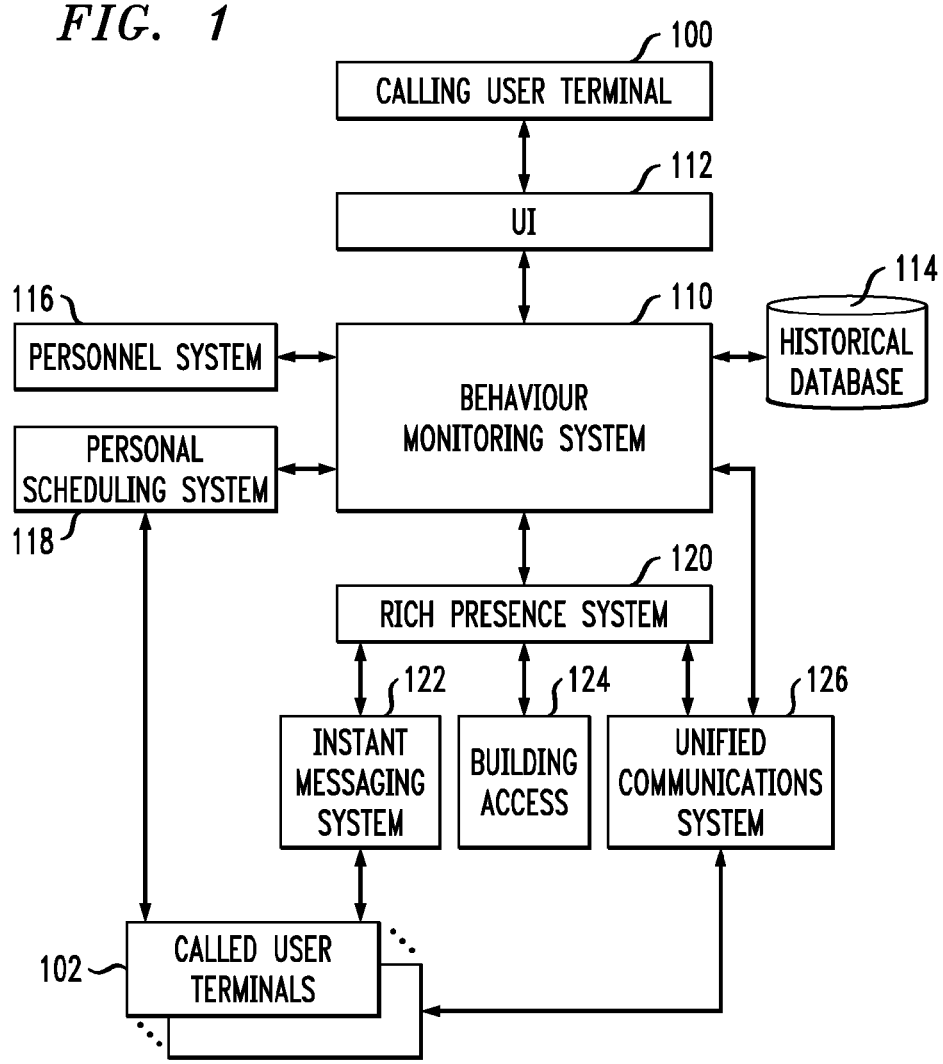
FIG. 1 is a block diagram of a communications system that includes an illustrative embodiment of the invention.

FIG. 1 shows an abstraction of a communications system that includes an illustrative embodiment of the invention. The system includes a plurality of user communications terminals 100-102, such as wired or wireless telephones, personal computers, personal digital assistants, etc. While FIG. 1 shows, for simplicity, the communications terminals of only two users—a calling party and a called party—the system would typically include communications terminals of a multitude of users, such as all employees of a company, or all students, administrators, and faculty of a university, or all employees of a government agency, etc. The system further includes a behavior monitoring system 110 whose function is to assist a communication-initiating user (referred to herein as the calling party) in determining what the preferable mode of communicating with another user (referred to herein as the called party) is at any one time, and/or what is the preferable time for communicating with the called party, based on historical behavioral patterns of the called party. For the purpose of determining users' behavior patterns, behavior monitoring system 110 monitors the communications behavior of all users of the system. For this purpose, behavior monitoring system 110 is connected to a rich presence system 120 that provides presence information on users of the communications system to behavior monitoring system 110. Rich presence system 120 collects user presence information from various sources, such as an instant messaging (IM) system 122 that provides conventional IM presence information, a unified communications system 126 that indicates whether a user is on a phone, on the web, emailing, faxing, etc., and a building access system 124, such as a network of badge readers, that indicates whether a user is in the building, and if so, where (e.g., their office, a conference room, etc.), and any other desired source of user presence information. Behavior monitoring system 110 is also illustratively connected to a personal scheduling system 118, such as an on-line calendaring system, that indicates users' schedules, and a personnel system 116, such as a corporate directory, that indicates users' roles or titles, which may indicate a user's availability based on the type of job they perform. Behavior monitoring system 110 stores information about users that it collects from the various entities 116-120 in a historical database 114. Behavior monitoring system 110 also provides a user interface (UI) 112 for interacting directly with users of the communications system via their user terminals 102-104. Interconnection between the various entities 100-126 is provided by any desired one or more communications network(s), such as a local area network, a wide area network (e.g., the Internet), a conventional telephony network, etc. The network is represented in FIG. 1 by arrows, which also represent functional communications connections between the entities 100-126.

Figure 2:
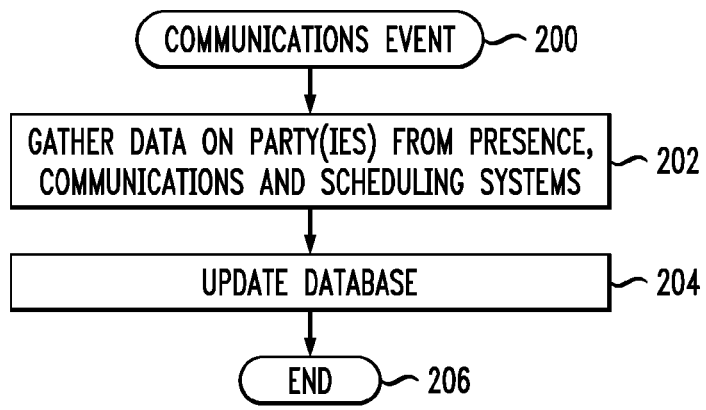
FIG. 2 is a flow diagram of an information-gathering function of the behavior monitoring system of the communications system of FIG. 1.

FIG. 2 shows the operation of behavior monitoring system 110 in gathering information. Information-gathering is triggered by a user's communications event, at step 200, such as a user sending an IM, calling or being called, sending or retrieving email, browsing the web, etc. Behavior monitoring system 110 is notified of a user's communications event and identity by rich presence system 120. In response, behavior monitoring system 110 gathers current status information about the user from rich presence system 120, unified communications system 126, and personal scheduling system 118, at step 202. The status information includes information the party's state, such as their presence information, and information on the disposition of the communication, such as was it picked up by the called party, or sent to voicemail, or not answered. From rich presence system 120, behavior monitoring system 110 gathers information such as which of the communications systems the user is using (e.g., IM, telephony, web), which of their user terminals the user is using (e.g., wired telephone, wireless telephone, computer), identity of the entity (e.g., another user) that the user is communicating with, and the nature of the communication (e.g., incoming call, outgoing call, email retrieval, IM texting). Additionally, it gathers information on the time taken to respond, and in some cases, the length or duration of the communication. From personal scheduling system 118, behavior monitoring system 110 gathers information such as whether the user has an event scheduled for this time, the type of scheduled event (e.g., teleconference, in-person meeting), and the location of the scheduled event. Behavior monitoring system 110 updates historical database 124 with the gathered information, at step 204, storing the information therein in association with an identifier of the user whose communication event triggered the data gathering. Behavior monitoring system 110 then ends its data-gathering activities, at step 206, until such time as it is triggered again by another communications event of one of the users of the communications system.

FIG. 3 shows the operation of behavior monitoring system 110 in responding to a user query. When a calling party wants to communicate with a called party, the calling party contacts user interface 112 of behavior monitoring system 110 via one of the calling party's communications terminals 100, at step 300. In response, behavior monitoring system 110 prompts the calling party via UI 112 to provide parameters of the communications need of the calling party. The system 110 seeks information germane to determining when and how the called party may best be contacted, at step 302, such as the identity of the called party, the level of urgency of the communication, the expected length of the communication or the complexity of the issue (from which the expected length may be automatically determined), the level of importance of the communication, and the sensitivity of the communication. Upon receiving the calling party's response to the prompt, at step 304, behavior monitoring system 110 gathers current status information about the called party from rich presence system 120 and personal scheduling system 118, at step 306, retrieves historical data about the called party from historical database 114, at step 308, and optionally obtains the called party's title or role from personnel system 116, at step 310. Behavior monitoring system 110 then analyzes the obtained information, at step 312, to determine a preferable mode of communicating with the called party at this time and/or the preferable time for communicating with the called party, at step 314. Behavior monitoring system 110 then reports the preference to the calling party via UI 112, at step 316, and ends its operation, at step 318.

The analysis, at step 312, may be as simple as pattern-matching the calling party's communications needs against the historical data and current state of the called party to find the historically-best method and/or time for having the desired type of communication with the called party. Or, the analysis may be as sophisticated as applying artificial intelligence to the data in order to make the determination. Or, the analysis may be in-between these levels of complexity, such as applying series of "if-then-else" rules to the data to make the determination. The following are a few illustrative examples of results that the analysis may produce:

1. At 12:00 P.M., a calling party indicates that it needs an extensive call with a called party. Behavior monitoring system 110 determines from historical data that the called party sends all voice calls to voicemail between 12:00 and 1:00 P.M., but responds promptly to IM messages. Behavior monitoring system 110 recommends that the calling party wait until after 1:00 P.M. to call the called party on the phone.

2. At 10:00 A.M., a calling party indicates that it needs an in-person voice call with a called party. Behavior monitoring system 110 determines that the called party is currently on a phone call, and determines from historical data and personal scheduling system 118 that the called party spends 2-3 hours in conference calls each morning but occasionally IMs during the conference calls, and that the called party picks up a large percentage of its mobile phone calls between 1:00 and 2:00 P.M. and a smaller percentage at other times. Behavior monitoring system 110 recommends that the calling party either IM the called party now, or call the called party on the called party's mobile phone between 1:00 and 2:00 P.M.

3. At 11:00 A.M., a calling party indicates that it needs to urgently communicate with a called party. Behavior monitoring system 110 determines that it has little communications history for the called party, other than that calls to the called party's desk phone get diverted to voicemail and that the called party picks up its voicemail and email in the evenings, and that the called party is not present in the building. From personnel system 116, behavior monitoring system 110 determines that the called party is a field technician. Behavior modification system 110 recommends that the calling party call the called party on the called party's cell phone.

Of course, various changes and modifications to the illustrative embodiment described above will be apparent to those skilled in the art. For example, although the examples given above were e mainly time-based, could use parameters that are behavior-based. E.g., when in meetings, a called party normally answers text/SMS messages but no other forms of communication. So if the system detects that the called party is in a meeting, it may advise the caller to use cell phone text messaging. The type of response needed by either party could also determine the preferred communication method. For example, a complex contract negotiation may require both parties to have access to online resources. Therefore, informal communication methods such as IM would not be appropriate in this instance. These changes and modifications can be made without departing from the spirit and the scope of the invention and without diminishing its attendant advantages. It is therefore intended that such changes and modifications be covered by the following claims except insofar as limited by the prior art.

What is claimed is:

1. A method comprising:

collecting data about parties' communications habits;

obtaining parameters of a desired communication between a calling party and a called one of the parties;

analyzing the collected data about the called party's communications habits in view of the parameters to determine a preferable communication mode of the desired communication; and indicating the preferable mode to the calling party.

2. The method of claim 1 wherein:

collecting data comprises collecting data on parties' past communications; and analyzing the collected data comprises analyzing the collected data about the called party's past communications to determine the called party's communications habits, and analyzing the determined communications habits in view of the parameters to determine the preferable mode.

3. The method of claim 1 wherein:

analyzing comprises analyzing the collected data about the called party's communications habits in view of the parameters to determine a preferable time for the desired communication; and indicating comprises indicating the preferable time to the calling party.

4. The method of claim 2 wherein:
collecting data comprises
for each one of a plurality of communications involving one of the parties, collecting data including a then-current state of the involved party and disposition of the communication.

5. The method of claim 4 wherein:
collecting data further comprises
collecting data on duration of the communication.

6. The method of claim 4 wherein:
the then-current state includes presence of the involved party.

7. The method of claim 1 further comprising:
obtaining current state of the called party; and wherein analyzing the collected data comprises
analyzing the collected data about, and the current state of, the called party in view of the parameters to determine the preferable mode of the desired communication.

8. The method of claim 7 wherein:
the current state includes presence of the called party.

9. The method of claim 1 wherein:
the preferable mode comprises at least one of a preferable medium and a preferable user terminal.

10. The method of claim 1 further comprising:
obtaining a schedule of the called party; and wherein analyzing the collected data comprises
analyzing the collected data about, and the current state and the schedule of, the called party in view of the parameters to determine the preferable mode of the desired communication.

11. A computer-readable medium containing instructions which, when executed by a computer, cause the computer to perform the method of one of claims 1-10.

12. An apparatus comprising:
a store for storing data about parties' communications habits;
a user interface for obtaining parameters of a desired communication between a calling party and a called one of the parties, and for indicating a preferable communication mode of the desired communication to the calling party; and
a behavior monitoring system for analyzing the stored data about the called party's communications habits in view of the parameters to determine the preferable mode.

13. The apparatus of claim 12 wherein:
the store is adapted for storing data on parties' past communications; and
the behavior monitoring system is adapted for analyzing the stored data about the called party's past communications to determine the called party's communications habits, and for analyzing the called party's communications habits in view of the parameters to determine the preferable mode.

14. The apparatus of claim 12 wherein:
the behavior monitoring system is further adapted for analyzing the stored data about the called party's communications habits to determine a preferable time for the desired communication; and
the user interface is adapted for indicating the preferable time to the calling party.

15. The apparatus of claim 13 wherein:
the data on parties' past communications comprise data for each one of a plurality of communications involving one of the parties, including for each communication a then-current state of the involved party and a disposition of the communication.

16. The apparatus of claim 15 wherein:
the data collected on each said past communication further comprise
data on duration of the communication.

17. The apparatus of claim 15 wherein:
the then-current state includes presence of the involved party.

18. The apparatus of claim 12 further comprising:
a presence system for determining current state of the called party; wherein
the behavior monitoring system is adapted to analyze the stored data about, and the determined current state of, the called party in view of the parameters to determine the preferable mode of the desired communication.

19. The apparatus of claim 18 wherein:
the current state includes presence of the called party.

20. The apparatus of claim 12 wherein:
the preferable mode comprises at least one of a preferable medium and a preferable user terminal.

21. The apparatus of claim 12 further comprising:
a scheduling system for providing a schedule of the called party; and wherein
the behavior monitoring system is adapted to analyze the stored data about, and the current state and the schedule of, the called party in view of the parameters to determine the preferable mode of the desired communication.

* * * * *